United States Patent [19]
Hartig

[11] Patent Number: 4,820,468
[45] Date of Patent: Apr. 11, 1989

[54] METHOD FOR MAKING WELDED HOLLOW PLASTIC PLATE HEAT EXCHANGERS

[76] Inventor: Martval J. Hartig, 218 Rowland Park Blvd., Wilmington, Del. 19803

[21] Appl. No.: 714,942

[22] Filed: Mar. 22, 1985

[51] Int. Cl.⁴ .................... B29C 65/22; B32B 3/28; F28F 3/12
[52] U.S. Cl. .................... 264/163; 156/251; 156/515; 156/518; 264/248
[58] Field of Search ............... 264/248, 163; 156/515, 156/518, 251

[56] References Cited

U.S. PATENT DOCUMENTS

| | | | |
|---|---|---|---|
| 2,510,383 | 6/1950 | Dalgleish | 264/248 X |
| 2,526,649 | 10/1950 | Gaibel | 156/251 |
| 2,677,747 | 5/1954 | Jaye | 264/163 X |
| 2,735,797 | 2/1956 | Schjeldahl | 156/251 X |
| 2,796,913 | 6/1957 | Fener et al. | 156/251 |
| 3,287,195 | 11/1966 | Piazze | 156/251 |
| 3,402,232 | 9/1968 | DeRusha | 264/163 X |
| 3,435,893 | 4/1969 | Withers | 264/248 X |
| 3,580,769 | 5/1971 | Parker | 156/308.4 X |
| 4,055,452 | 10/1977 | Carlisle | 156/251 |

FOREIGN PATENT DOCUMENTS

| | | | |
|---|---|---|---|
| 144219 | 1/1936 | Austria | 264/248 |
| 53-44277 | 4/1978 | Japan | 264/248 |
| 53-114861 | 10/1978 | Japan | 264/163 |
| 1054078 | 11/1983 | U.S.S.R. | 156/251 |
| 840186 | 7/1960 | United Kingdom | 156/251 |
| 1090557 | 11/1967 | United Kingdom | 264/248 |

OTHER PUBLICATIONS

*Webster's Ninth New Collegiate Dictionary,* Springfield, Mass, Merriam–Webster, 1986, pp. 174,855.

*Primary Examiner*—Philip Anderson

[57] ABSTRACT

A process for the assembly of welded plastic hollow plate heat exchangers in which hollow plastic plates with channels running in one direction are welded at the open edge of the sheets to hollow plastic spacing strips which have at least one closed channel running along the open edge of the hollow plastic plate parallel to the open face of the hollow plastic plate by using a taut hot wire, hot knife, or similar cut off and seal techniques and the heat exchangers made by this process. Further improved ruggedness and strength are achieved by melting together the ends of the spacers and the adjacent closed top of the hollow plates.

5 Claims, 3 Drawing Sheets

METHOD FOR MAKING WELDED HOLLOW PLASTIC PLATE HEAT EXCHANGERS

BACKGROUND OF THE DISCLOSURE

Hollow plate heat exchangers are well known in the art and are widely used where large exchange areas in a small volume are desirable. They have been fabricated in both metal and plastic for doing various jobs. In spite of he recognized superiority of welded heat exchangers, nearly all the hollow plate heat exchangers of the prior art are held together by caulk, adhesives, or gaskets usually with mechanical clamping means. In the case of metal exchangers, seal has been accomplished by using lower melting solders or brazing alloys. The reason for this is the great difficulty of making the very long welds associated with flat plate heat exchangers and the difficulty of melting together the light and close spaced structure of the hollow plates without destroying the structure or closing up the openings in the structure rendering it useless for heat exchange. An all-welded monolithic plastic heat exchanger would be desirable since to avoids the use of sealants or adhesives which are usually less resistant to the environment and temperature than the base plastic of which the plates are made. It avoids loss of operability of the structure which could delaminate due to the harsh environment of the exchangers and the differential expansion of the material of the exchanger plates and the sealant or temperature cycling. Finally it avoids the need for mechanical clamping of the structure necessary with many designs, thus avoiding complications and increased weight and susceptibility to degradation of the clamping means. Welding thus gives a better heat exchanger at usually a lower cost than other fabricating techniques.

Many attempts have been made to weld together hollow plastic plate heat exchangers, by use of hot gas or hot plate welding. These have universally failed except for very small exchangers, because of destruction of the delicate structure of hollow plastic plates or closing up of the holes in the closely spaced skins of the sheet by the melted plastic.

Success at making large flat seals necessary for the welding of hollow plate heat exchangers has been achieved by embedding electrical wires in the seal area and then melting controlled amounts of plastic to form a seal even in very fragile structures without excessive distortion. This method is expensive and results in the presence of the melt wire in the seal area which could lead to problems of corrosion or temperature cycling. Another technique is the incorporation of a film of the same plastic as the sheets to which has been added an electromagnetic susceptor between the surface of the hollow sheet and the spacer. By exposure to the proper electromagnetic energy source, the film and the surface of the hollow sheet and the spacer are rendered molten in a controlled fashion without distorting the structure of the hollow sheet. This technique is expensive and would be very difficult to apply to large multi-plate heat exchangers, which will be the most useful.

Hot wire and hot knife techniques are used for sealing and cut-off of film structures to form bags, pillows, and similar structures from film. They have not been applied to welding of massive structures since they give a very shallow seal and are difficult to use in the presence of massive sections of polymer.

It is plainly desirable and technically very difficult to weld hollow plastic plate heat exchangers and a novel method of doing it is the basis for this invention.

OBJECT OF THE INVENTION

The main purpose of this invention is to provide a monolithic all welded plastic plate heat exchanger. Such a heat exchanger would be especially useful in air-to-air heat exchange covering wide ranges of humidity and temperature. Currently plastic hollow plate heat exchanges are made by providing edge seals of silicone caulk and held together by a clamping means and used for this purpose. They lose the seal at the caulk to the plastic on cycling through humidity and temperature cycle. Deterioration of the clamping means also occurs and can lead to expensive and difficult repairs.

An all welded construction with seal not subject to deterioration by cycling through humidity and temperature cycles and which "breathes" as a unit in response to environmental changes, would last for a long time without deterioration.

In addition an all welded construction leads to a rugged heat exchange unit which is strong enough to stand alone and is easily incorporated into ducts and casings.

SUMMARY OF THE INVENTION

This invention is a method for making a welded plastic hollow plate heat exchanger comprising the steps of:

(1) Stacking up alternate layers of hollow plastic plates which are open on two opposite sides and closed at the other two edges and which are substantially the same size alternatively with hollow plastic spacers with at least one spacer all along each of the open edges of the hollow plastic plates, said spacer having at least one septum running down the length of the spacer.

(2) Clamping the array of hollow plastic plates and spacers together by mechanical and/or adhesive means to hold them in place for processing.

(3) Providing a hot wire or similar sealing means which is held taut by an automatic device such as a spring to compensate for changes in length of the wire due to changes in temperature. Said wire being long enough to pass completely through an edge of the stacked array of hollow plastic plates and spacers and provided with a controlled means for changing the temperature of the wire.

(4) Heating the hot wire to a temperature substantially in excess of the melting point of the plastic.

(5) Passing the hot wire through the array of hollow plastic sheets and spacers parallel to the open edge of the sheet thereby sealing the film surface of the hollow plastic plates to the film surfaces of the spacer in contact with the sheets and slicing off a thin sheet from the edge which is removed to prevent resealing to the cut-off surface.

(6) Allowing the unit to cool below the melting point of the plastic.

(7) Repeating steps (4) through (6) on the other open edge of the array.

(8) Removing the clamping means to provide a finished hollow plate heat exchanger welded together at the edges.

In addition to the basic method above, a further method of improving the strength and integrity of the heat exchanger comprising the steps of:

(1) Providing a hot bar sealer which is longer than a row of spacers and hollow plastic plates and wider than a row of spacers.

(2) Heating this sealer to a temperature above the melting point of the plastic in the heat exchanger.

(3) Placing the hot bar sealer on the end of a row of spacers and melting them down until the hot bar sealer just enters the closed tops of the hollow plastic plates in contact with the spacers.

(4) Removing the hot bar sealer either with or without cooling to form a weld between the end of the spacers and the tops of the hollow plastic sheet.

(5) Repeating this with each of the ends of each of the spacers.

As a further improvement a non-melting slip sheet such as aluminum foil either with or without a mold release may be incorporated in the seal to facilitate removal of the hot bar. To make an even stronger seal a thin strip of the same plastic in the heat exchanger may be placed in the seal between the ends of the spacers and the sealing bar.

DETAILED DESCRIPTION OF THE INVENTION

Figure 1:
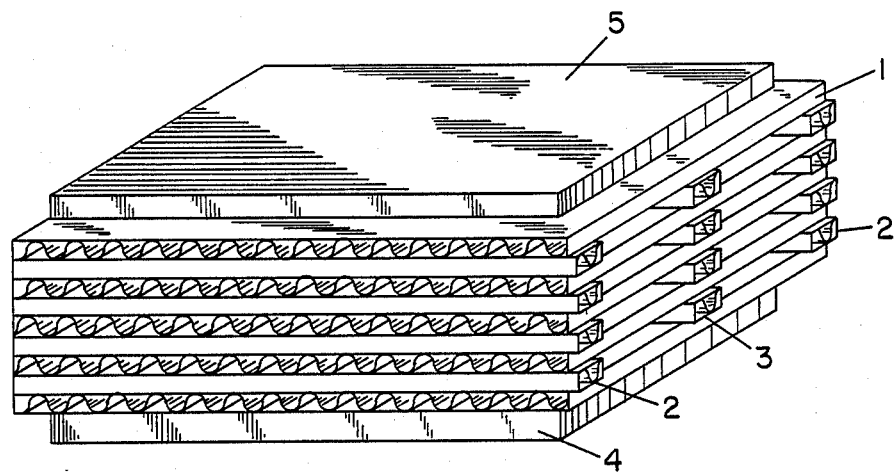
FIG. 1 is a view of the stack of hollow plastic plates and spacers before welding.

As shown in FIG. 1 the first step is the layup of the heat exchanger. Here hollow plastic plates (1) of essentially the same size are laid up alternately with edge spacers (2) and internal spacers (3) to form a stacked array. This stacking is done on a bottom plate (4) which is about one-half inch smaller all around than the hollow plastic plates (1), so that the plastic (1) projects about one-half inch on all sides. The stacked array is covered with a top plate (5) and the top and bottom plates are held in place by a clamping means (not shown) which give free access to the open edges of the sheets. The stacked array is now clamped to hold it steady during welding.

Figure 2:
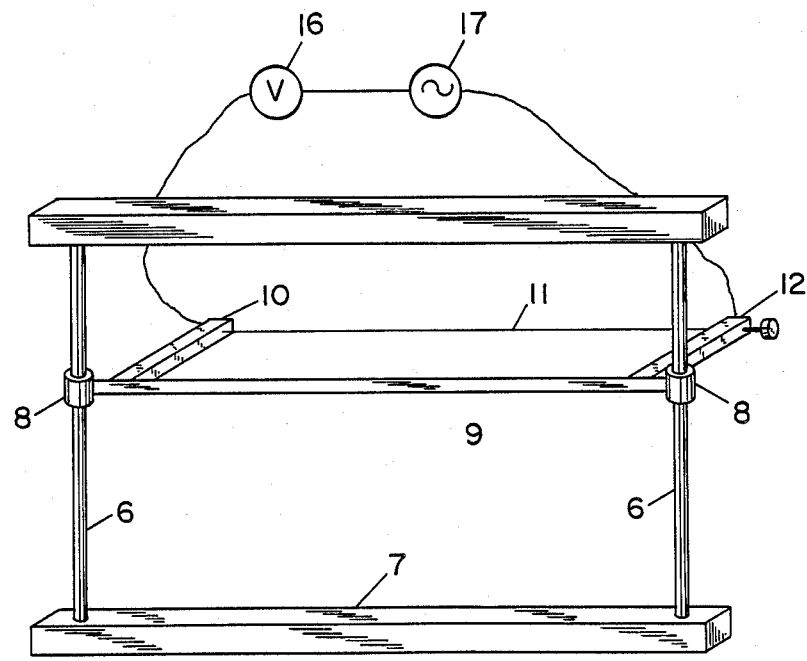
FIG. 2 is a view of a hot wire welding apparatus.

FIG. 2 shows one type of welding means. This is the taut hot wire sealer. The heat sealer consists of a pair of precision rods (6) held in a set of bars (7) which hold the precision rods equispaced and parallel. A pair of precision bearings (8) are engaged with the precision rods. A non-conductive bar (9) is fastened to the precision bearings so that it moves up and down in a parallel fashion along a flat plane parallel to the precision rods. A pair of conductive bars (10) hold the hot wire (11) equispaced from the bearings. One end of the wire is mounted to a sliding rod going through one of the conductive bars (11) to allow spring loading of the wire (12) so that the wire will stay taut in spite of changes in length due to changes in temperature. The wire is now fastened to a source of alternating current (17) with a variable transformer (16) to control the voltage and thereby the temperature of the wire.

Figure 3:
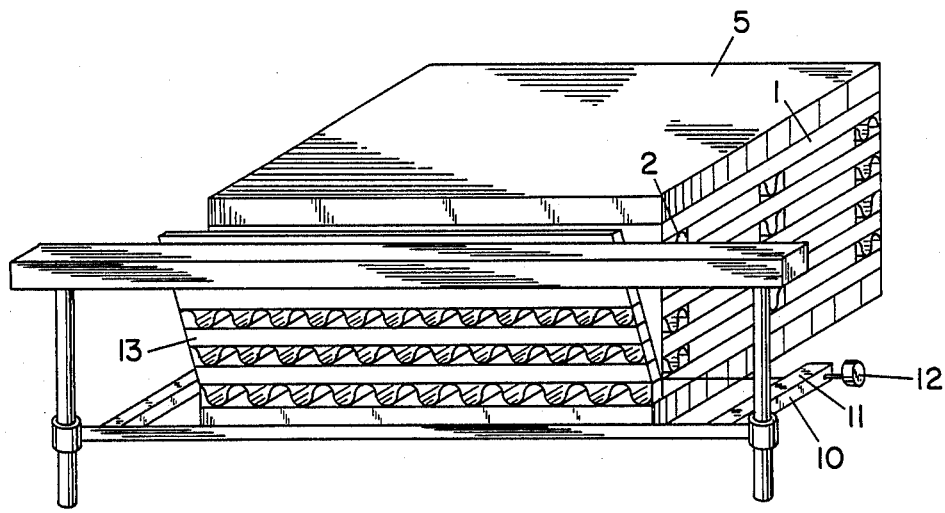
FIG. 3 is a view of the heat exchanger during the welding process.

The welding apparatus (FIG. 2) is now attached to the bottom plate of the holder (4) so that the plane of passage of the wire is in the middle of the edge spacers (2). This wire is now heated to a light orange color by adjusting the variable transformer (16). The spring (12) is tightened to give a taut wire. The bar (9) is now moved down along the precision rods, engaging the hot wire (11) with the hollow plastic plates (1) and edge spacer bars (2). The hot wire melts the plastic and as it passes through the stacked array welds the bottom film of the hollow plate (1) to the top film of the adjacent spacer (2) and then welds the bottom film of the spacer (2) to the top film of the next plate (1) and so on until one side of the array is welded together. In the course of the welding, a small edge slice (13) is removed from the edge of the array and bent away from sealed areas so it will not reweld to the face of the array and cause problems. This is shown in FIG. 3.

In a similar manner a weld is made in the other open edge of the hollow plastic plates in the array. After cooling the unit to below the melting point of the plastic, it is removed from the clamp and give a usable heat exchange element.

Figure 5:
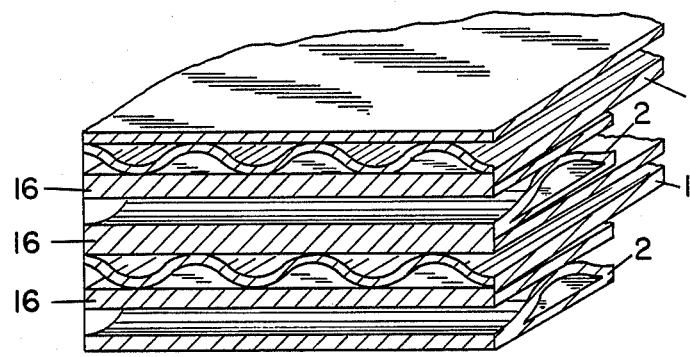
FIG. 5 is a view of a section of the finished weld showing the melted together film skins of the plates and spacers after the melt sealing and cut off with the hot wire sealer.

FIG. 5 shows the nature of the weld produced by the hot wire cut off and sealer in a greatly enlarged view of a small section. In this FIG. 5 the bottom film of the top plate (1) is welded to the top film of the adjacent spacer (2) to give a closed welded edge (16) equal in area to the combined thickness of the two films. This welded edge along with the continuous septum of the spacer isolates the hollow inside of the plate from its outer surface. This is repeated on the bottom film of this spacer and the top film of the next hollow plate until the entire exchanger is welded. This array now forms a dual passage system in which one passage in the hollow plate and the other passage is the area between adjacent plates thereby forming a heat exchange element for separated flow of two fluids.

Although this heat exchanger formed by the edge welding is a perfectly useful device, its strength and ruggedness can be improved by welding the spacers into the closed edge of the hollow plastic plates. This is done by providing a hot bar sealer which is wider than the spacers and longer than the width of the exchanger. This bar is heated above the melting point of the plastic and forced downward into the top edge of the exchanger, melting the spacers (2) and (3) in turn into the top edge of the hollow plastic plates (1). The bar penetrates deep enough to just insure a complete seal of plates and spacers. The bar is withdrawn hot or cooled down below the melting point and then removed.

Figure 6:
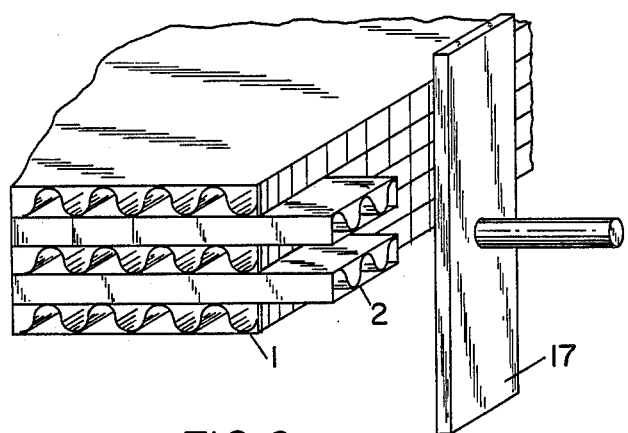
FIG. 6 is a view of the set up of the bar sealer for melting together the ends of the spacers and the top of the exchanger plates to improve the strength of the exchanger.

FIG. 6 shows the set up for welding the spacers into the top of the closed edge of the hollow plate. The hot bar welder (17) is poised to enter and melt the tops of the spacers into the plates. If the use of a release sheet or the addition of a reinforcing plastic strip is desired either or both can be placed between the welding bar (17) and the spacer ends (2) and incorporated into the final weld.

Figure 7:
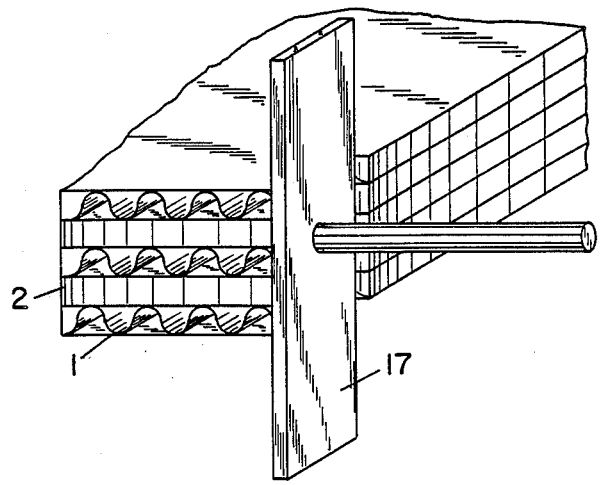
FIG. 7 is a view of the penetration of the bar sealer into the top edge of the plates sealing together the spacers and the plates in this area.

FIG. 7 shows the melting together of the tops of the spacers (2) with the closed top of the hollow plates of the heat exchanger. The next step will be the removal of the hot bar sealer either with or without cooling to form the finished reinforcing seal for this row of spacers.

Figure 4:
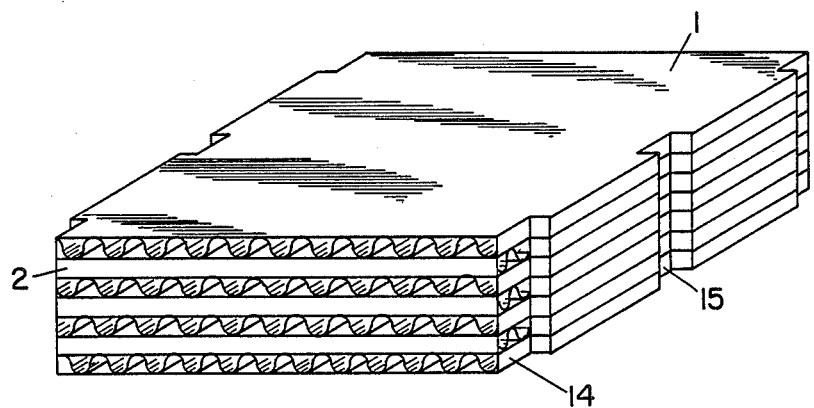
FIG. 4 is a view of a finished heat exchanger after the secondary welding of the spacers to the hollow plastic plates.

FIG. 4 is a view of the finished reinforced heat exchanger. The hollow plastic plates (1) have been welded to the spacers (2). The edge spacers are now welded at both ends to the closed tops of the hollow plastic plate (14). The internal spacers have also been welded at both ends (15) to the closed edge of the hollow plastic plates.

At times and in a random fashion the melted plastic sticks to the bar. This is prevented by adding a non-melting sheet such a aluminum foil between the hot bar and the exchanger. At times this sheet will stick to the exchanger. Spraying the surface of the sheet in contact with the melt with a release agent such as a silicone spray or a vegetable oil spray as used in cooking can prevent this.

The heat exchangers formed by this process are now ready for use. They have been used to recover 75% to 85% of the sensible heat from ventilation of mushroom houses, veal barns, pig houses, chicken houses, etc. When manufactured of linear polyethylene they have been continuously cycled from below a −40 degrees F. to as high as 160 degrees F. without signs of distress. In general for the same efficiency they cost only one-quarter to one-fifth of competitive metal exchangers and frequently operate with much lower energy requirements for the fan moving the air.

Almost any melt fabricable polymer is suitable for making heat exchangers by this technique. The polyolefins are most useful within their temperature capability. These include polymers and copolymers of ethylene, polymers and copolymers of propylene, polybutylene is useful for the higher temperatures. For special uses where the environment is suitable, polymers and copolymers of vinyl chloride and the various melt fabricable fluorocarbon polymers such as polyvinylidene fluoride, perfluorinated ethylene propylene copolymers, etc, are useful. Engineering plastics such a nylons, polyesters, polyphenylene oxide, polypenylene sulfide, acrylonitrile, butadiene, styrene copolymers, polyurethanes, polysulfones, and the like can be used where improvement in physical properties and temperature resistance are desired.

The hollow plastic plates may be made by such techniques as open celled extrusions, by thermoforming such as used to make plastic corrugated sheets, and similar techniques.

The thickness of the hollow plastic plates will generally range from one-sixteenth inch to one-half inch with the preferred range from one-eighth inch to three-sixteenth inch. The thickness of the skins can range from 0.001 inch to 0.025 inch depending on the planned stress levels of the heat exchanger. The spacer will have similar dimensions and may have the same or a different thickness. The spacers may be cut from hollow plastic plates or they may be separately formed as U channels, square hollow channels, square hollow multiple channels, or similar shapes. In addition, for internal spacers which are only welded at the ends extruded plastic tubing can be used. The spacer strips can be any desired width. Generally they will be from one-eighth inch to one inch wide. The edge spacers are generally about one-fourth inch to three-fourths inch which allow for easily making the cut-off seal. The internal spacers are generally from one-eighth inch to one-half inch wide.

The hot wire sealing means must:

(1) Be long enough to pass through they desired section of the array.

(2) Be in a holder which keeps it taut and straight in spite of changes in length due to changes in temperature.

(3) Be carried in a set of ways which keeps the wire in a plane parallel to the ways and constantly spaced so the wire can move through the edges of the hollow plastic plates and through the edge spacers to form the melt seal.

(4) Have a source of variable voltage or current so that the temperature of the wire can be regulated as desired.

The hot wire is generally made from nickel chromium alloys commonly used for making electric heaters. For very corrosive polymers it may be made of platinum or platinum alloys. Any suitable resistance wire may be used. The wire generally is from 0.010 inch to 0.1 inch in diameter. Smaller wires tend to be fragile and difficult to handle while heavier wires produce more melt than desired and may distort the openings in the hollow plastic plates. Flat wires may also be used with the narrow edge passing into the sealing array. They may be any width although less than one-half inch is desirable. Thickness can vary from a few mils to as much as 100 mils. In place of a wire, a hot knife could be used with the edge of the knife entering the array for sealing.

If desired, the final consolidation of the heat exchanger is made by welding the ends of the spacers to the closed edge of the hollow plastic plates. The welding can be accomplished with any suitable hot bar sealer. It is preferable to have a stainless clad strip heater to avoid corrosion. The sealing bar should have good conductivity such as aluminum or brasses to give a uniform temperature. The sealing bar should have a controlled variable temperature available. Typically the sealing bar should be one-half inch to one and one-half inch wide and long enough to seal one entire group of spacers at one time.

The sealing area may be covered with a slip sheet such as a piece of aluminum foil or higher melting plastic film such as "Kapton" sold by E. I. du Pont de Nemours and Company, Inc. In addition if desired, the slip sheet may be coated with a release agent such as a silicone or a higher melting vegetable oil or wax.

The process of this invention is now illustrated by the following examples:

EXAMPLE 1

Hollow plastic sheets made of linear polyethylene 0.145 inch thick with 0.010 inch thick skins formed by welding the two skins to a corrugated medium one-eighth inch high with corrugations on one-fourth inch centers were cut to form hollow plastic plates 46 inches high by 30 inches wide. Plastic spacers 48 inches long and one-half inch wide were cut from the same sheet along the corrugations.

An array of 85 plates with 85 sets of spacers was now laid up on a 29 inch by 45 inch base. The sheets were spaced to have one-half inch overhand on the sides of the base. Edge spacers were placed on each open edge of the sheet and held in place by a drop of hot melt glue. Three equally spaced internal spacers were added to each plate as the array was built up.

After all 85 layers were added a top plate with a clamping means was placed on the top of the array and the array compacted to 24 inches with a hydraulic jack.

A sealing means similar to FIG. 2 in which the precision rods were one-half inch diameter and 36 inches long held in square holders one inch on a side and 60 inches long. A round bearing one and one-half inch wide and three inches long was bored to one-half inch and honed onto each of the rods. The wire support bar was a fiberglass and plastic L 60 inches long reinforced in the center by a steel L. The free span of the wire was 52 inches and it was held taut by a one-half inch by three inch spring compressed to two inches. The wire was a 16 gauge wire made of suitable nickel chromium resistance metal. The wire was attached to a 110 volt AC electric source equipped with a heavy duty auto transformer.

The hot wire sealing means was bolted to the support plate so that the wire was spaced at the mid line of the edge spacers and the edge of the hollow plastic plate. With the wire held above the array a voltage of 27 volts was applied to the wire. It turned a cherry red in color. The wire was now lowered into contact with the array and the melt welding was started. As the wire entered the array the length of wire in contact with the array lost its color due to heat loss into the melting plastic. The wire was now allowed to melt through the array driven by the weight of the bearings and carefully applied pressure. The wire melted through the array at the rate of about two inches per minute. A thin sheet, about one-fourth inch thick, was cut off the edge face of the array and removed as it formed. After passage of the wire all the way through the array, the current was shut off and the array allowed to cool.

The same procedure was repeated on the other open face. The array was now removed from the clamp forming a heat exchanger with good integrity in which the bottom film of each sheet was welded to the top film of each spacer and the bottom film of each spacer welded to the top film of the spacer. By and large the melt formed on the wire sealed up most of the imperfections due to non-flatness of the hollow plastic plates and spacers. This was an unexpected bonus of this novel type of sealing. Very small holes occasionally left at the edge of the sheet were sealed by painting the face of the exchanger.

EXAMPLE 2

The process was the same as used in example one except that after the wire entered the array the voltage was increased to 32 volts. The free span of the wire which has been bright red turned yellow white and soon ruptured. This method of sealing gives an unexpected problem as the wire enters the array it cools off decreasing the resistance so that more current flows heating the portion of wire not in contact with array to a very high temperature leading to rupture.

EXAMPLE 3

This experiment was carried out as example two except a blast of cooling air was directed at the free area of the wire before the voltage was increased. Now with the increased voltage and more heat available, the wire passed more quickly and uniformly through the array to give an even better weld.

EXAMPLE 4

The heat exchanger of Example 1 was placed on a set of ways in a vertical position so that the spacer ends were facing up. A sealing bar of aluminum one-fourth inch by one and one-half inch by 30 inches to which was attached firmly a 750 volt strip heater of similar size with a stainless steel jacket was heated to 500 degrees F. A strip of 1.5 mil aluminum two inches wide and coated on one side with a mold release agent was laid over the ends of the spacers. The sealing bar was forced down on the spacers melting them until the sealing bar touched and penetrated about $\frac{1}{8}$ inch into the sealed top edge of the hollow plastic plates. The array was now welded together at this area. This was repeated for each of the groups of spacers on both the top and bottom of the exchanger to give a very strong well spaced plate type heat exchanger.

EXAMPLE 5

Another exchanger of Example 1 was made. It was set up like Example 4 except that a strip of liner polyethylene one inch wide and 0.1 inch thick and 24 inches long was placed on top of the edge spacers before sealing. When the unit was sealed and cooled a very strong edge was obtained suitable for clamping into any type of apparatus which could use the heat exchanger.

The above description shall not be construed as limiting the ways in which this invention may be practiced but shall be inclusive of many other variations that do not depart from the broad interest and intent of this invention.

What is claimed is:

1. A method for making a welded plastic hollow plate heat exchanger comprising the steps of:
   (a) stacking two or more hollow plastic plates open at two opposite edges and closed at the other two edges alternately with hollow spacer strips running parallel to the open edges of the hollow plastic plates with at least two spacer strips, each one adjacent to the open edges of the hollow plastic plate, said hollow spacer strips having at least one septum running the full
   length of the strip,
   (b) holding the array of plates and spacers in place with a mechanical or adhesive means or both,
   (c) providing melt sealing means, such as a taut hot wire,
   (d) heating the melt sealing means to a temperature substantially above the melting point of the plastic forming the array,
   (e) passing the hot sealing means in a place parallel to the open edge of the sheet and bisecting the spacer strip thereby cutting and melting together the skin on the bottom of the hollow plate to the skin of the top of the adjacent spacer and the skin of the bottom of the spacer to the skin on the top of the hollow plate immediately below the spacer until the entire array is melted together,
   (f) removing the thin sheet formed from the cut-off edges and spacer to prevent it from rewelding to the cut-off face,
   (g) allowing the array to cool to a temperature below the melting point of the plastic to form a welded together face,
   (h) repeating the step (d), (e), (f), and (g) on the opposite side face of the array to form a welded monolithic hollow plastic plate heat exchanger.

2. The method of claim 1 which is improved by providing an air blast to cool sections of the wire not in contact with the plastic to allow the use of more power to give a faster and more uniform seal without destruction of the wire by overheating in the open sections.

3. A method for improving the strength of a heat exchanger made by the process of claim 1 comprising the steps of:

(a) providing a welding bar which is longer than the desired weld length and wider than the spacers which can be heated in a controlled fashion to a temperature above the melting point of the plastic, (b) forcing the hot welding bar into the ends of the row of spacers melting them until the hot bar contacts the top of the closed edges of the hollow plastic plates and melting the plastic to the spacer in this area, (c) removing the welding bar either with or without cooling to a temperature below the melting point of the plastic, (d) repeating (b) and (c) until both ends of all the spacers are welded to the hollow plastic sheets.

4. The method of claim 3 in which a non-melting film or sheet with or without a mold release is placed between the welding bar and the ends of the spacers.

5. The method of claim 4 in which a thin strip of plastic of the same composition as the plastic hollow plate is placed between the non-melting film and the ends of the spacers and then melted into them to give a reinforced edge for use in sealing.

* * * * *